United States Patent [19]

Remond

[11] Patent Number: 5,011,397
[45] Date of Patent: Apr. 30, 1991

[54] APPARATUS FOR PRODUCING PREVULCANIZED TREADS

[75] Inventor: Michel Remond, Ceyrat, France

[73] Assignee: Compagnie Generale des Etablissements Michelin, Clermont-Ferrand Cedex, France

[21] Appl. No.: 226,069

[22] Filed: Jul. 29, 1988

Related U.S. Application Data

[60] Division of Ser. No. 84,482, Aug. 12, 1987, which is a continuation of Ser. No. 782,365, Oct. 1, 1985, abandoned.

[30] Foreign Application Priority Data

Oct. 4, 1984 [FR] France .................................. 84 15362

[51] Int. Cl.$^5$ .................................................. B29D 30/52
[52] U.S. Cl. ........................................ 425/328; 425/35; 425/335
[58] Field of Search .................... 425/47, 35, 373, 435, 425/38, 40, 50, 385, 335, 328, 371; 156/96, 126; 152/187

[56] References Cited

U.S. PATENT DOCUMENTS

| | | | |
|---|---|---|---|
| 1,423,349 | 7/1922 | McClenathen | 425/335 |
| 1,427,217 | 8/1922 | McClenathen | 425/328 X |
| 2,181,859 | 12/1939 | Baker et al. | 425/373 |
| 3,283,795 | 11/1966 | Schelkmann | 152/187 |
| 3,779,684 | 12/1973 | Folkes | 425/47 X |
| 3,815,651 | 6/1974 | Neal | 156/126 X |
| 3,829,271 | 8/1974 | Taylor | 425/385 |
| 3,915,607 | 10/1975 | Folkes | 425/47 X |
| 3,964,949 | 6/1976 | Kent et al. | 156/96 |
| 3,994,653 | 11/1976 | Marangoni | 425/335 X |
| 4,003,686 | 1/1977 | McLeod et al. | 425/373 |

FOREIGN PATENT DOCUMENTS

| | | |
|---|---|---|
| 391354 | 3/1924 | Fed. Rep. of Germany . |
| 1232845 | 1/1967 | Fed. Rep. of Germany . |
| 2642990 | 4/1977 | Fed. Rep. of Germany . |
| 1136864 | 5/1957 | France . |
| 1224704 | 6/1960 | France . |

Primary Examiner—Richard L. Chiesa
Attorney, Agent, or Firm—Brumbaugh, Graves, Donohue & Raymond

[57] ABSTRACT

An apparatus for producing prevulcanized tread particularly useful for the recapping of tires having, in stress-free condition, a constant curvature in its longitudinal direction whose radius corresponds substantially to that of the tires to be recapped, the sole of the tread being concave, is characterized by the fact that the tread has two ends in its longitudinal direction. The apparatus includes quasicylindrical inner and outer molds which travel in a curved path corresponding to the radius of curvature to be imparted to the curved tread.

8 Claims, 2 Drawing Sheets

APPARATUS FOR PRODUCING PREVULCANIZED TREADS

This application is a division of application Ser. No. 084,482, filed on Aug. 12, 1987, a continuation of application Ser. No. 782,365, filed on Oct. 1, 1985 (now abandoned).

BACKGROUND OF THE INVENTION

The present invention concerns prevulcanized treads used, in particular, for the recapping of tires. It also concerns a method of manufacturing such treads as well as an apparatus capable of the continuous production of such treads.

When prevulcanized treads are used for recapping pneumatic tires, they are either treads prepared in flat strips of long length or treads prepared in the form of rings. The flat strips by definition have an infinite radius of curvature in their longitudinal direction. In general they are without wings at their side ends which will cover the sidewalls of the recapped tires or else are provided with only very small wings. This process is known as "top-cap" recapping, since it concerns only the crown of the tire.

It is well known that when a flat tread without wings or with very small wings is used to recap tires, the lateral zones of the tread are the seat of substantial stresses; it is necessary to exert large pressures on these lateral zones in order to apply them securely onto the carcass of the tire. With this method it is practically impossible to obtain recapped tires which have the appearance of new tires. Furthermore, starting points of separation are frequently noted in the lateral zones. Federal Republic of Germany Patent Application No. 26 42 990 shows an example of a tread produced in long length.

When the tread is prepared in the form of a ring, it generally has a radius of curvature in its transverse direction so that it may securely fit the crown of the tire, as well as wings which apply themselves rather low on the shoulder, which makes it possible to obtain recapped tires without irregularity or defect in appearance. This process is usually referred to as "full-cap" recapping. U.S. Pat. No. 3,815,651 shows an example of a tread produced as a ring.

The major drawback of recapping with a tread which has been prepared as a ring is that it is necessary to use a ring corresponding to the carcass to be recapped for each size of tire to be recapped. It is therefore necessary to maintain a large stock of ring treads of different dimensions.

SUMMARY OF THE INVENTION

The object of the present invention is to produce prevulcanized treads which combine the advantages of treads which have been prepared flat in long length and of treads prepared in rings, without having the drawbacks inherent in either of these two types.

It is therefore a question of producing a prevulcanized tread which in its stress-free condition has a constant radius of curvature in its longitudinal direction which can furthermore have one or more radii of curvature in its transverse direction so as to adapt itself correctly to the carcass on which it is to be glued, and which can be produced in long length so as to be able to be used on a carcass of any diameter in the same manner as treads which have been prepared flat.

The prevulcanized tread of the present invention having, in its stress-free condition, a constant curvature in its longitudinal direction whose radius corresponds substantially to that of the tires to be recapped, the sole of the tread being concave, is characterized by the fact that the tread has two ends in its longitudinal direction.

By this it is meant that the tread is not produced as a ring. It may be produced in long length, which means a length at least equal to the length of the circumference of the tire of largest development which is to be recapped. Thus the tread of the present invention is suitable for tires of all diameters. In order to limit the amount of waste, the length is preferably equal to a multiple of the minimum length defined above, for instance 4 to 10 times. The tread is cut to the desired dimension at the time of its use, as is customarily done with treads which have been prepared flat.

In accordance with the present invention, the method of manufacturing prevulcanized treads by molding raw rubber between first molding means for the sole of the tread and second molding means for the tread pattern, the first means defining in closed position at least in part a first quasi-cylindrical surface and the second means defining in closed position at least in part a second coaxial quasi-cylindrical surface located radially outward of the first means, is characterized by the fact that:

(a) the first and the second means in closed position are immovable with respect to each other and are imparted a movement of rotation around the axis of said surfaces, (b) raw rubber is introduced between the first means and the second means, (c) the first and second means are brought into closed position by moving them together relative to each other in which position the rubber receives a flow of heat for the vulcanization thereof, and (d) the first and second means are brought into open position so that the tread can be removed.

The apparatus in accordance with the present invention for manufacturing prevulcanized treads comprising first molding means for the sole of the tread, second molding means for the tread pattern, and heating means for vulcanizing the tread, the first means defining in closed position at least in part a first quasi-cylindrical surface and the second means defining in closed position at least in part a second coaxial quasi-cylindrical surface located radially outward of the first surface, is characterized by the fact that (a) the first and second means in closed position are immovable with respect to each other and are imparted a movement of rotation around the axis of said surfaces, and (b) the first and second means define during the molding and vulcanizing of the tread a continuous molding space arranged as a circular arc of less than 360°.

The first molding means for the sole are preferably formed of a ring which is machined on the outside to the profile of the sole and the second means are formed of segments whose radially inner face molds the tread pattern.

The entire unit is imparted a movement of rotation the speed of which is determined by the curing law of the rubber used. The raw rubber is therefore placed on the ring and molded by the closing of one segment, which is kept closed during a displacement corresponding to an arc of less than 360° so as to effect the vulcanization, whereupon the segment is moved away radially and the prevulcanized tread is extracted. The production is thus effected continuously. The length of the tread is limited only by considerations of weight and space.

BRIEF DESCRIPTION OF THE DRAWINGS

The figures of the accompanying drawing show how the present invention can be carried out in practice.

DESCRIPTION OF PREFERRED EMBODIMENTS

Figure 1:
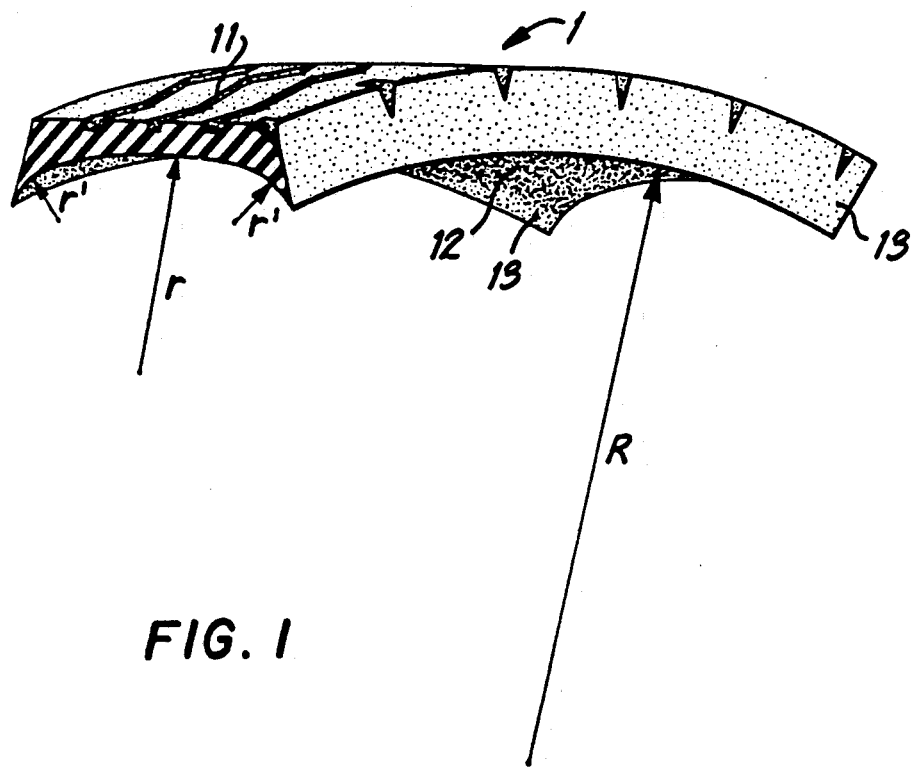
FIG. 1 shows a prevulcanized tread in accordance with the present invention.

In order that the characteristics of the prevulcanized tread of the present invention will be clearly evident, it has been shown only in part in FIG. 1. It is designated generally as 1. The tread pattern 11 or outer face of the prevulcanized tread 1 can be noted, as well as the sole 12, that is to say the face intended to be glued onto the crown of the tire to be recapped. The prevulcanized tread 1 is characterized by the novel combination of two features: It is of long length and it has a radius of curvature R in its longitudinal direction. The sole 12 advantageously has a radius of curvature r in its transverse direction in order better to fit the shape of the crown of the tire to be recapped. In a preferred variant embodiment, the radius of curvature r is variable; it is maximum at the center and minimum at the shoulders, as diagrammatically indicated in FIG. 1 where the transverse radius of curvature under the wings 13 has been designated by r'. There are thus produced wings 13 which apply themselves against the upper part of the sidewalls of the tire to be recapped. This variant is used in particular for aggressive tread patterns which require "full-cap" recapping. However, the variant embodiments in which $r = r' = \infty$ also fall within the scope of the present invention; this is "top-cap" recapping, which is sufficient in many cases.

The essential feature of the present invention is the combination in the longitudinal direction of a long length with a radius of curvature R in vulcanized state and free of any stress. For the storing of such treads, they are wound spirally, forcing them to assume a radius of curvature less than R at the start of the spiral, the radius of curvature then increasing gradually so as to exceed R if necessary. Storage is effected very easily in spiral shape, since the tread always automatically inscribes itself between two parallel planes which are spaced apart by an amount equal to the width of the tread, whether in a state free of all stress or in a state not entailing stresses other than those referring to the modification of the natural curvature in the longitudinal direction, as explained above. There will be noted here another important advantage of the treads of the present invention as compared with treads which are prepared flat, namely the spiral storage is effected with a lower level of stress and hence there is less tendency towards surface cracking under tension. Since it is cut to length at the time of recapping, the tread is a multi-dimension tread, in the same way as a tread which is prepared flat.

Figure 2:
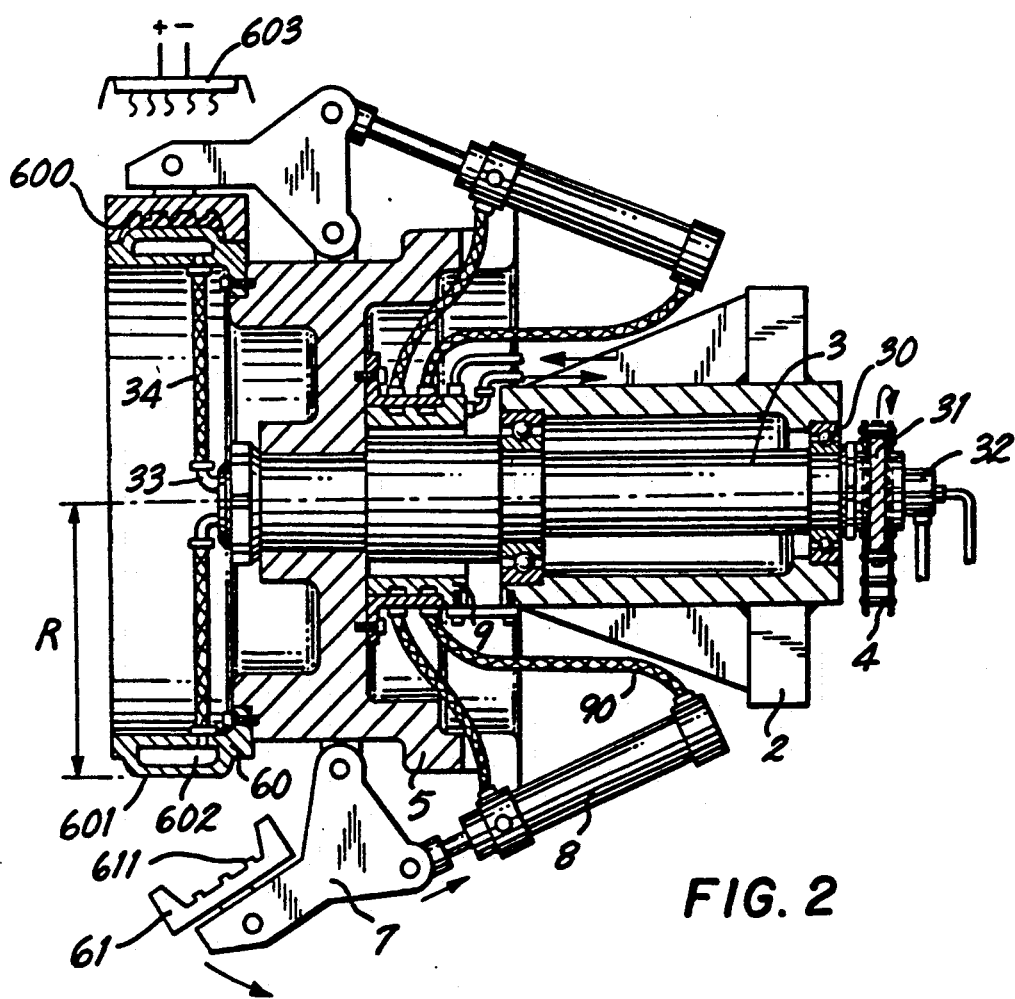
FIGS. 2 and 3 show an apparatus for manufacturing prevulcanized treads in accordance with the present invention.
Figure 3:
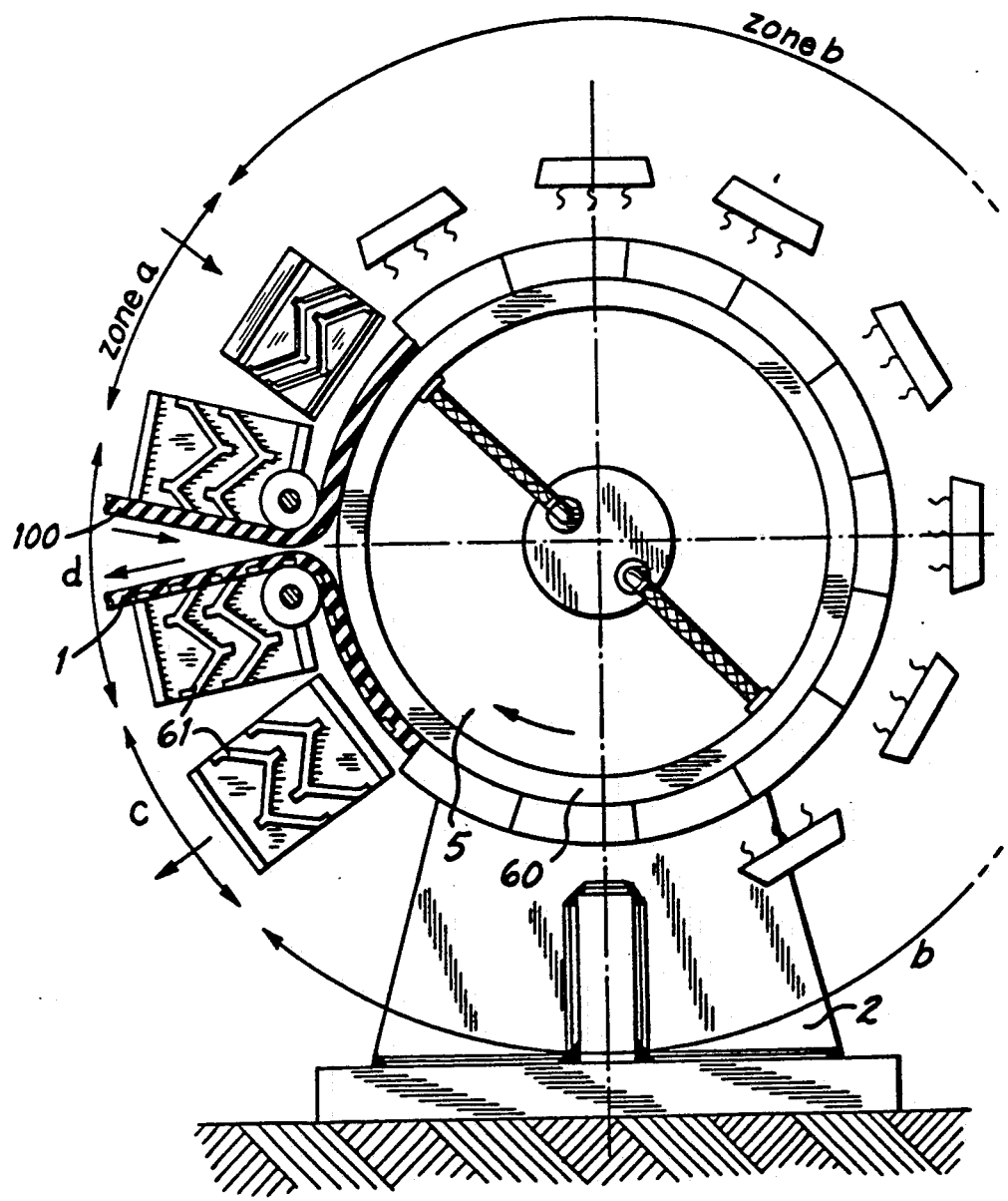

Referring to FIGS. 2 and 3, the method of manufacturing prevulcanized treads in accordance with the present invention will now be described, as well as an apparatus which makes it possible to produce a prevulcanized tread according to the present invention.

There can be noted a frame 2, a shaft 3 supported on this frame 2 via ball bearings 30 and driven in rotation by a chain 4 (in part not shown) engaged on a pinion 31 fastened to one end of the shaft 3. At its other end, the shaft 3 bears a disk 5 which is fixed in rotation with respect to the shaft 3. The disk 5 bears a ring 60 which is machined on the outside to the profile 601 of the sole 12 of the tread 1 to be molded. The radius R of the ring 60 is equal to the radius of curvature R of the tread 1 to be produced. On the inside of the ring 60, there is provided a cavity 602 for the circulation of a heat-transport fluid in order to assure the vulcanizing of the tread 1. This heat-transport fluid is fed to the apparatus through a turning joint 32 fastened to one end of the shaft 3; it passes into conduits 33 provided in the shaft 3 and pipes 34 connected to the cavity 602. The disk 5 also bears arms 7 on which there are attached segments 61 the radially inner face 611 of which molds the tread pattern 11 of the tread 1. The radial distance apart of each segment 61 is assured by a piston and cylinder unit 8. A rotary distributor 9 makes it possible to feed the piston and cylinder units 8 with control fluid under pressure from a pressure central (not shown) via hoses 90. Heating of the segments 61 is also provided, for instance by infrared panels 603 or by any other suitable system.

The method of manufacture can be clearly understood by referring in particular to FIG. 3. Upon emergence from the extruder or unwinder, the crude rubber 100 is deposited on the ring 60. Under the effect of the rotation of the shaft 3 in the direction indicated by the arrow, the raw rubber 100 is applied against the face 601 of the ring 60. The design of the rotary distributor 9 makes it possible to bring the segments 61 together in the region a so as to assure the molding, to hold them closed so as to define a continuous space 600 arranged on a circular arc b of less than 360°, and then again moving these segments 61 apart in the zone c in order to permit the extraction of the prevulcanized tread 1. The feeding of the raw rubber 100 and the extraction of the prevulcanized tread 1 are effected in the zone d where the segments 61 are maintained open. The circular arc corresponding to the zone b is preferably between 180° and 300°. It can be seen that the movement of rotation of the shaft 3 can be continuous, thus permitting continuous manufacture of prevulcanized treads 1, which are cut to the desired length by any suitable means.

Numerous variant embodiments of the apparatus can easily be contemplated by the man skilled in the art, who will have clearly understood the present invention from the foregoing description. Thus the tread pattern 11 can be molded by a ring which bears on its inner face the negative of the desired tread pattern. In this case, the sole is molded by elements which bear the desired profile on their upper face, the elements being capable of moving apart radially inwards in a manner suitable to permit the introduction of raw rubber and the removal of the tread and to define, in accordance with the present invention, a molding space which extends over a circular arc of less than 360°. One can furthermore contemplate any other solution, provided that the molding means can define a space in the form of a continuous circular arc of less than 360° and can move apart from each other in order to permit the introduction of raw rubber and the extraction of the prevulcanized tread.

What is claimed is:
1. In an apparatus for manufacturing prevulcanized treads comprising first molding means for the sole of the tread, second molding means for the tread pattern and heating means for vulcanizing the tread, the first molding means defining in closed position at least in part a first quasi-cylindrical surface and the second molding means defining in said closed position at least in part a second coaxial quasi-cylindrical surface located radially outward of the first surface, the improvement comprising (a) means for moving the second molding means from a spaced apart open position to said closed position, the first and second molding means in said closed position are immovable with respect to each other and are imparted a movement of rotation around the axis of said surface, and (b) the first and second molding means define during the molding and vulcanizing of the tread a continuous molding space arranged as a circular arc of less than 360°.

2. An apparatus according to claim 1, wherein the first molding means are formed of a ring which is machined on the outside to the profile of the sole and by the fact that the second molding means are formed of segments whose radially inner face molds the tread pattern.

3. An apparatus according to claim 1 or 2, wherein the molding space extends over a circular arc of between 180° and 300°.

4. An apparatus according to claim 1 or 2, wherein said movement is continuous.

5. An apparatus for manufacturing a prevulcanized tread of constant curvature in its longitudinal direction comprising a continuous inner mold rotatable about an axis and having a radius corresponding to the radius of curvature to be imparted to the tread, a plurality of outer curved molds movable in sequence from a spaced apart open position to a closed position with respect to said inner mold, the closed molds defining together a continuous molding space rotatable about said axis and arranged as a circular arc of less than 360° in which the outer molds form the tread pattern and the inner mold forms the sole, means for moving the outer molds between open and closed positions with respect to the inner mold, means for feeding a strip of raw unvulcanized rubber to the inner mold before an outer mold moves into closed position, means for heating the unvulcanized rubber in the closed molds to vulcanize the rubber and impart a constant curvature to the tread, and means for discharging in the longitudinal direction the prevulcanized tread of constant curvature after the outer molds move to open position.

6. An apparatus as set forth in claim 5 including means for displacing the outer molds transversely relative to the inner mold to their open position out of the paths of the incoming strip of raw unvulcanized rubber fed to the inner mold and of the outgoing prevulcanized tread of constant curvature discharged from open molds.

7. An apparatus as set forth in claim 6 including a common carrier for the inner and outer molds and in which said means for displacing the outer molds out of the paths of the incoming strip and outgoing prevulcanized tread include means for pivoting the outer molds on said common carrier, the carrier transporting the inner and outer molds about said axis of rotation.

8. An apparatus as set forth in claim 7 including drive means for moving the inner mold continuously about its axis.

* * * * *

UNITED STATES PATENT AND TRADEMARK OFFICE
CERTIFICATE OF CORRECTION

PATENT NO. : 5,011,397
DATED : Apr. 30, 1991
INVENTOR(S) : Michel Remond

It is certified that error appears in the above-identified patent and that said Letters Patent is hereby corrected as shown below:

Col. 5, line 13, "surface" should read --surfaces--.

Col. 5, lines 20-21, delete "by the fact that".

Signed and Sealed this

Fifteenth Day of September, 1992

Attest:

DOUGLAS B. COMER

Attesting Officer

Acting Commissioner of Patents and Trademarks